US008731715B2

(12) United States Patent
Ko et al.

(10) Patent No.: US 8,731,715 B2
(45) Date of Patent: May 20, 2014

(54) MOBILE DEVICE AND METHOD AND COMPUTER-READABLE MEDIUM CONTROLLING SAME FOR USING WITH SOUND LOCALIZATION

(75) Inventors: Won Jun Ko, Yongin-si (KR); Yong Jae Kim, Seoul (KR); Woo Sup Han, Yongin-si (KR); Ki Cheol Park, Hwaseong-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 555 days.

(21) Appl. No.: 12/954,236

(22) Filed: Nov. 24, 2010

(65) Prior Publication Data
US 2011/0125504 A1 May 26, 2011

(30) Foreign Application Priority Data
Nov. 24, 2009 (KR) .......................... 10-2009-114150

(51) Int. Cl.
*G10L 21/00* (2013.01)
*G10L 25/00* (2013.01)
*H04R 29/00* (2006.01)
*G06F 19/00* (2011.01)

(52) U.S. Cl.
USPC ............... 700/245; 704/275; 704/E11.001; 901/1; 381/56

(58) Field of Classification Search
USPC ........................ 700/245–264; 704/270, 275; 704/E11.001–E11.007; 709/227–229; 901/1; 381/56
See application file for complete search history.

(56) References Cited

U.S. PATENT DOCUMENTS

| 6,789,043 | B1* | 9/2004 | Nelson et al. | 702/152 |
| 2006/0002566 | A1* | 1/2006 | Choi et al. | 381/58 |
| 2009/0177323 | A1* | 7/2009 | Ziegler et al. | 700/259 |

OTHER PUBLICATIONS

Angela Israni et al, "PeanutBot, The Audio Homing Robot", ECE 476 Final Project, Spring 2007, 12 Pages.*
Blosser et al, "Implementing a Microphone Array on a Mobile Robotic Device", 2008, 20 Pages.*
Sasaki et al, "Multiple Sound Source Mapping for a Mobile Robot by Self-motion Triangulation", Proceedings of the 2006 IEEE/RSJ International Conference on Intelligent Robots and Systems, pp. 380-385.*
H Atmoko et al, "Accurate sound source localization in a reverberant environment using multiple acoustic sensors", Measurement Science and Technology, 19(2008), 10 Pages.*

* cited by examiner

*Primary Examiner* — Khoi Tran
*Assistant Examiner* — Abby Lin
(74) *Attorney, Agent, or Firm* — Staas & Halsey LLP

(57) ABSTRACT

A mobile device moves by calculating a distance between a sound source and the mobile device using a sound source direction estimation technique. The mobile device moves by a reference distance in a direction perpendicular to a direction in which the mobile device faces the sound source when call sound of the sound source is generated, outputs voice to instruct to the sound source to generate recall sound, checks a directional angle of the mobile device when recall sound is generated by the sound source, calculates the distance between the sound source and the mobile device according to the reference distance and the directional angle of the mobile device, and moves to the vicinity of the sound source.

18 Claims, 9 Drawing Sheets

MOBILE DEVICE AND METHOD AND COMPUTER-READABLE MEDIUM CONTROLLING SAME FOR USING WITH SOUND LOCALIZATION

CROSS-REFERENCE TO RELATED APPLICATIONS

This application claims the benefit of Korean Patent Application No. 10-2009-0114150, filed on Nov. 24, 2009 in the Korean Intellectual Property Office, the disclosure of which is incorporated herein by reference.

BACKGROUND

1. Field

Example embodiments relate to a mobile device which moves by generating traveling information and a method and computer-readable medium controlling the same.

2. Description of the Related Art

In general, a movable robot has been used in various fields including industry and toys. An example of detectors mounted in such a robot includes a sound source direction detector to detect a direction of a sound source. The sound source direction detector detects the direction of the sound source using order of a sound signal output through a receiver mounted in the robot. Sound output from such a sound source uses a smaller amount of data than visual data and a monotonous data format, but is helpful in an environment where illumination is not present or a place which is outside a visual field due to an obstacle. Sound may be used as important information to detect objects which cannot be visually detected.

Meanwhile, research into an automatic interface function which may be substituted for an input system such as a camera or a keyboard by mounting a microphone in a robot and receiving and recognizing calling voice or clapping sound of a user has been conducted. Concern about a technique in which a robot responds to a sound source including voice of a consumer to accurately detect the position of the sound source is being increased.

SUMMARY

Therefore, it is an aspect of the example embodiments to provide a mobile device which calculates a distance between the mobile device and a sound source using a sound source direction estimation technique of calculating a direction of a sound source according to an output of the sound source and moves to the vicinity of the sound source according to the calculated distance information, and a method and computer-readable medium controlling the same.

The foregoing and/or other aspects are achieved by providing a method of controlling a mobile device, the method including moving, by a computer, the mobile device by a reference distance in a direction perpendicular to a direction in which the mobile device faces a sound source, when the sound source generates a call sound, outputting, by the computer, a voice to instruct the sound source to generate a recall sound, and checking, by the computer, a directional angle of the mobile device, calculating a distance between the mobile device and the sound source according to the reference distance and the directional angle of the mobile device, and moving the mobile device toward the sound source.

The moving of the mobile device by the reference distance in the direction perpendicular to the direction, in which the mobile device faces the sound source, when call sound the sound source generates a call sound may include checking an angle between a front direction of the mobile device and the direction in which the mobile device faces the sound source according to the calling sound, and rotating the mobile device according to an angle between the direction perpendicular to the direction in which the mobile device faces the sound source and the direction in which the mobile device faces the sound source and moving the mobile device by the reference distance.

The moving of the mobile device by the reference distance in the direction perpendicular to the direction in which the mobile device faces the sound source, may include moving the mobile device by the reference distance in the direction perpendicular to the direction in which the mobile device faces the sound source on the right side thereof.

The moving of the mobile device by the reference distance in the direction perpendicular to the direction in which the mobile device faces the sound source, may include moving the mobile device by the reference distance in the direction perpendicular to the direction in which the mobile device faces the sound source on the left side thereof.

The distance between the mobile device and the sound source may be calculated by the following equation according to the reference distance and the directional angle of the mobile device:

$$R = L/\cos(180-\theta)$$

where, R denotes the distance between the mobile device and the sound source, L denotes the reference distance, and θ denotes the directional angle of the mobile device relative to the sound source.

When the distance between the mobile device and the sound source is calculated according to the reference distance and the directional angle of the mobile device, the mobile device may move toward the sound source using information about the direction of the sound source and the distance as traveling information.

The call sound of the sound source may be sound having a predetermined pattern, stored in the mobile device in advance.

The reference distance may change according to an environment of the mobile device, and, when the reference distance changes, the distance between the mobile device and the sound source may be calculated according to the changed reference distance and the directional angle of the mobile device.

The foregoing and/or other aspects are achieved by providing a mobile device including a direction estimator to estimate a directional angle of the mobile device relative to a sound source making a calling sound, a traveling direction determination unit to determine a traveling direction using the estimated directional angle, a driving unit to move the mobile device by a reference distance in the traveling direction. a voice output unit to output a voice to instruct the sound source to generate a recall sound, and a sound source position calculator to calculate a distance between the sound source and the mobile device according to the reference distance and the directional angle of the mobile device when the directional angle of the mobile device relative to the sound source is estimated according to the recall sound.

The direction estimator may estimate the directional angle of the mobile device relative to the sound source based on one of the call sound or and the recall sound by the sound source.

The directional angle of the mobile device relative to the sound source may be an angle between a front direction of the mobile device and a direction in which the mobile device faces the sound source.

The traveling direction determination unit may determine the traveling direction as a direction perpendicular to the direction in which the mobile device faces the sound source when the call sound is made.

The traveling direction determination unit may determine the direction in which the mobile device faces the sound source as the traveling direction when the recall sound is generated.

The driving unit may move the mobile device toward the sound source when the distance between the sound source and the mobile device is calculated.

The voice output unit may output voice to instruct the sound source to generate the recall sound when the mobile device moves by the reference distance.

The sound source position calculator may calculate the distance between the sound source and the mobile device by the following equation according to the reference distance and the directional angle of the mobile device estimated by the recall sound:

$$R = L/\cos(180-\theta)$$

where, R denotes the distance between the mobile device and the sound source, L denotes the reference distance, and $\theta$ denotes the directional angle of the mobile device relative to the sound source.

The foregoing and/or other aspects are achieved by providing a method, comprising moving, by a computer, a mobile robot by a reference distance in a direction perpendicular to a sound source, when the sound source generates a first sound, outputting, by the computer, an instruction to the sound source to generate a second sound and checking, by the computer, a directional angle of the mobile robot, calculating a distance between the mobile robot and the sound source based on the reference distance and the directional angle of the mobile robot, and moving the mobile robot toward the sound source.

The foregoing and/or other aspects are achieved by providing at least one non-transitory computer readable medium including computer readable instructions that control at least one processor to implement methods of one or more embodiments.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which:

FIG. 2C is a diagram showing another example of a multi-microphone structure attached to the outside of the mobile device shown in FIG. 2A;

DETAILED DESCRIPTION

Reference will now be made in detail to embodiments, examples of which are illustrated in the accompanying drawings.

Figure 1:
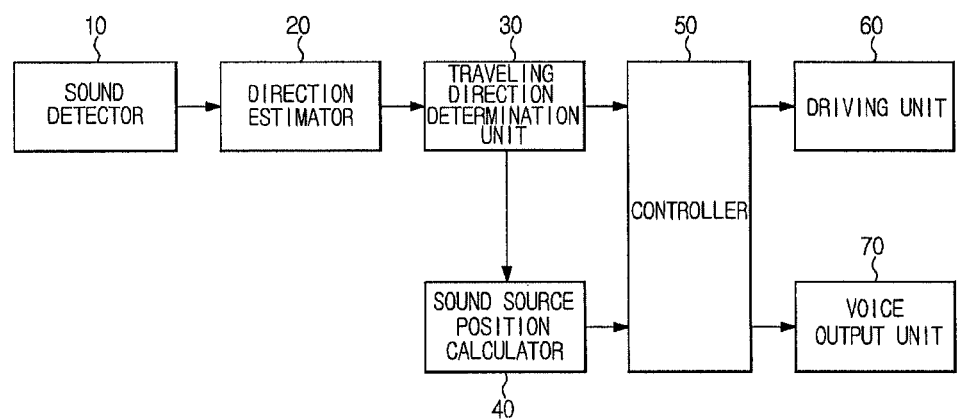
FIG. 1 is a control block diagram of a mobile device according to example embodiments.

FIG. 1 is a control block diagram of a mobile device according to example embodiments.

Figure 2A:
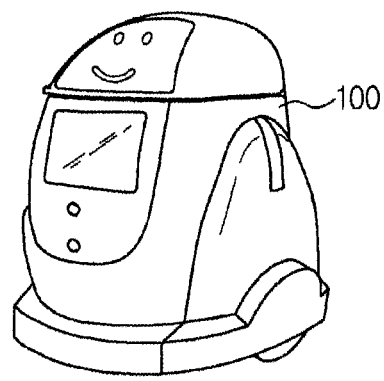
FIG. 2A is an appearance diagram of a mobile device according to example embodiments.
Figure 2B:
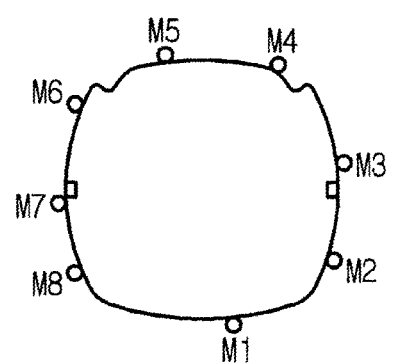
FIG. 2B is a diagram showing an example of a multi-microphone structure attached to the outside of the mobile device shown in FIG. 2A.
Figure 2C:
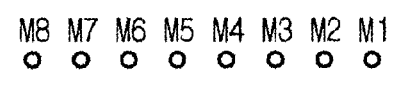

FIGS. 2A to 2C are diagrams of a multi-microphone structure, wherein FIG. 2A is an appearance diagram of a mobile device, FIG. 2B is a diagram showing an example of a multi-microphone structure attached to the outside of the mobile device shown in FIG. 2A, and FIG. 2C is a diagram showing another example of a multi-microphone structure attached to the outside of the mobile device shown in FIG. 2A.

As shown in FIG. 1, the mobile device 100 may include a sound detector 10, a direction estimator 20, a traveling direction determination unit 30, a sound source position calculator 40, a controller 50, a driving unit 60 and a voice output unit 70.

The sound detector 10 may eliminate noise of an externally input signal, detect a signal component having a predetermined level from the signal from which noise has been eliminated, and check whether the detected signal is sound having a predetermined pattern. The sound detector 10 may transmit the externally input signal to the direction estimator 20 if the externally input signal is the sound having the predetermined pattern.

The direction estimator 20 may estimate a directional angle of the mobile device 100 relative to a sound source 200. The direction estimator 20 may estimate the directional angle of the mobile device 100 in response to sound generated from the sound source 200. The direction estimator 20 may receive the sound generated from the sound source 200 through multiple microphones shown in FIG. 2. Meanwhile, referring to FIG. 5A, when the mobile device 100 is positioned at a first position P1, the directional angle of the mobile device 100 relative to the sound source 200 may be an angle between a front direction 111a of the mobile device 100 and a direction 110a in which the mobile device 100 faces the sound source 200. The angle between the front direction 111a of the mobile device 100 and the direction 110a in which the mobile device 100 faces the sound source 200 may include two angles $\theta 1$ and $\theta 2$. The angle $\theta 1$ when the mobile device 100 rotates from the front direction in a counter-clockwise direction may be defined as the directional angle of the mobile device 100, and the angle $\theta 2$ when the mobile device 100 rotates from the front direction in a clockwise direction may be defined as the directional angle of the mobile device 100. Hereinafter, description will be given on the assumption that the angle $\theta 1$ when the mobile device 100 rotates from the front direction in the counterclockwise direction is defined as the directional angle of the mobile device 100.

Figure 5A:
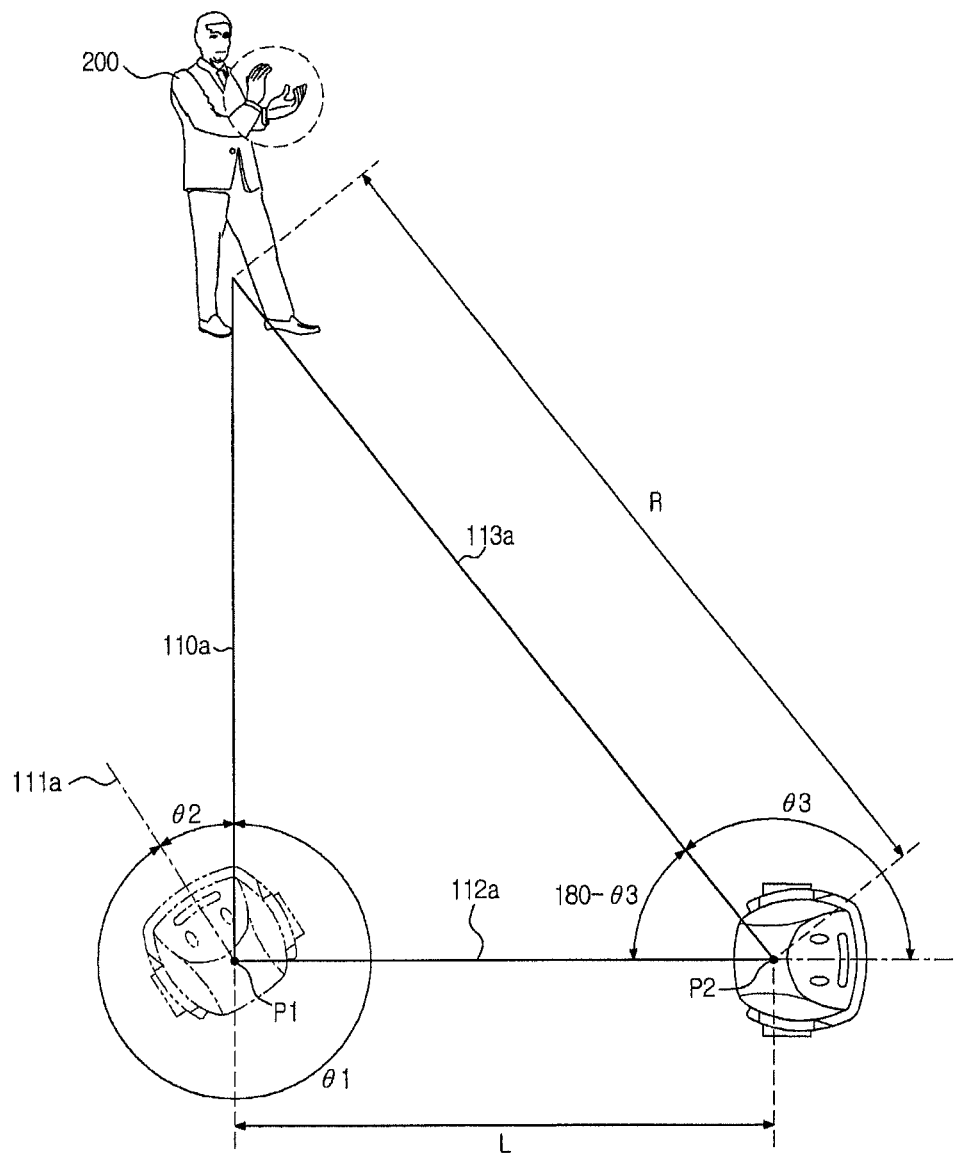
FIGS. 5A and 5B are diagrams of a relationship between a mobile device and a sound source according to example embodiments.

If the angle $\theta 1$ between the front direction 111a of the mobile device 100 and the direction 110a in which the mobile device 100 faces the sound source 200 satisfies $-180 < \theta 1 < 180$, the direction estimator 20 may estimate the angle as the directional angle of the mobile device 100. If the angle $\theta 1$ between the front direction 111a of the mobile device 100 and the direction 110a in which the mobile device 100 faces the sound source 200 does not satisfy $-180 < \theta 1 < 180$, the direction estimator 20 may carry out an operation of the angle θ1 and ±360 to correct the angle to satisfy −180<θ1<180. If the estimated angle θ1 is greater than 180 degrees, an operation of (estimated angle θ1−360) is carried out and, if the estimated angle θ1 is less than −180 degrees, an operation of (estimated angle θ1+360) is carried out such that the estimated angle falls in the range of −180<θ1<180. Referring to FIG. 5A, the directional angle of the mobile device 100 at the first position P1 becomes θ1. Since θ1 (for example, 330 degrees) is outside the range of −180<θ1<180 and is greater than 180 degrees, the operation of (330−360=−30) is carried out such that the angle falls in the range of −180<θ1<180. At this time, the directional angle of the mobile device 100 relative to the sound source 200 is −30 degrees.

The traveling direction determination unit 30 may determine a traveling direction using the directional angle estimated by the direction estimator 20. Referring to FIG. 5A, the traveling direction determination unit 30 may check the positional direction 110a of the sound source 200, according to the directional angle θ1 of the mobile device 100 estimated by the direction estimator 20 and determine a direction 112a perpendicular to the positional direction of the sound source 200 as a first direction in which the mobile device 100 will move.

Figure 5B:
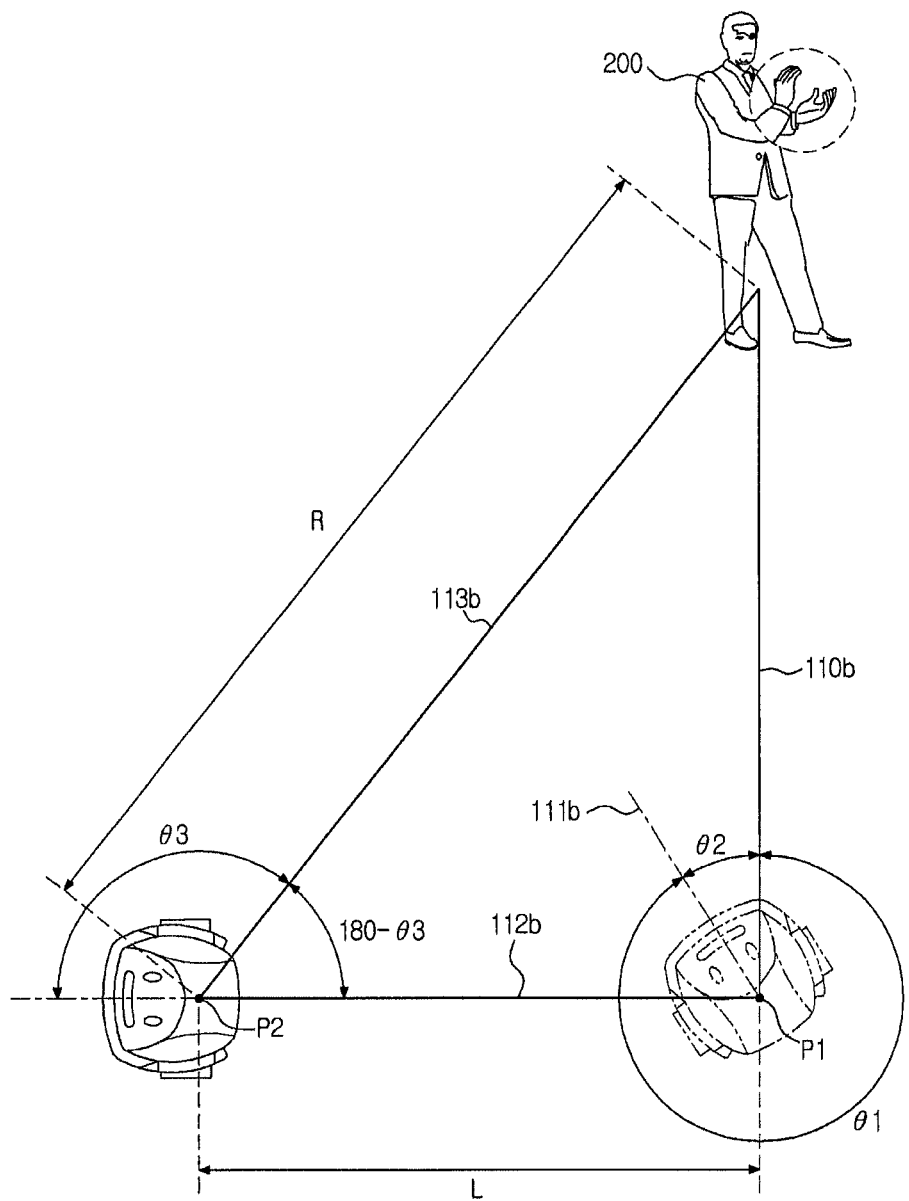

The traveling direction determination unit 30 may determine the direction such that the mobile device 100 moves toward the sound source 200 if the distance between the sound source 200 and the mobile device 100 is calculated by the below-described method after the mobile device 100 moves in the direction perpendicular to the positional direction of the sound source 200. The traveling direction determination unit 30 may determine the traveling direction of the mobile device 100 in the direction perpendicular to the positional direction of the sound source 200 on the right side thereof as shown in FIG. 5A or determine the traveling direction of the mobile device 100 in the direction perpendicular to the positional direction of the sound source 200 on the left side thereof as shown in FIG. 5B. Meanwhile, the determination of the traveling direction determination unit 30 as to whether the mobile device moves in the direction perpendicular to the positional direction of the sound source 200 on the right side thereof or on the left side thereof may be designed by a designer in advance or may be designed to be performed by the controller 50 according to the environment of the mobile device 100 (e.g., detection of an obstacle).

The sound source position calculation unit 40 may calculate the distance between the sound source 200 and the mobile device 100. Referring to FIG. 5A, the mobile device 100 may move from the first position P1 to a second position P2 by a predetermined distance (L; hereinafter, referred to as a reference distance), and the direction estimator 20 may estimate the directional angle θ3 of the mobile device 100 relative to the sound source 200 in a state in which the mobile device moves by the reference distance. The sound source position calculator 40 may calculate a distance R between the mobile device and the sound source 200 as expressed by Equation 1 using the reference distance L and the directional angle θ3 of the mobile device 100 estimated in a state in which the mobile device moves by the reference distance L.

$$R=L/\cos(180-\theta 3) \quad \text{Equation 1}$$

The controller 50 may control the driving unit 60 such that the mobile device 100 moves toward the sound source 200 along the traveling direction determined by the traveling direction determination unit 30. The controller 50 may control the driving unit 60 according to the distance information between the mobile device and the sound source 200, which is transmitted from the sound source position calculation unit 40, to move the mobile device 100 to the vicinity of the sound source 200. Referring to FIG. 5A, the controller 50 may control the mobile device 100 to move toward the sound source 200 according to the information about the distance R between the mobile device 100 and the sound source 200 calculated at the second position P2 and the information about the positional direction 113a of the sound source 200. Meanwhile, the controller 50 may control the driving unit 60 such that the mobile device 100 moves toward the sound source 200 by a distance less than the distance R and stops in the vicinity of the sound source 200 without a collision.

The controller 50 may drive the voice output unit 70 and instruct the sound source 200 to generate recall sound when the mobile device 100 reaches the second position P2 of FIG. 5A. When the sound source 200 outputs sound at the second position P2, the traveling direction determination unit 30 may estimate the direction of the mobile device 100 relative to the sound source 200 according to the sound of the sound source 200 at the second position P2.

The driving unit 60 may drive wheels and move the mobile device 100 under the control of the controller 50.

The voice output unit 70 may output a voice instructing the sound source 200 to output sound, when the mobile device reaches the second position P2 of FIG. 5A. For example, the voice output unit 70 may audibly output "Clap your hands" or "Call me" to instruct the sound source 200 to generate sound.

Figure 3:
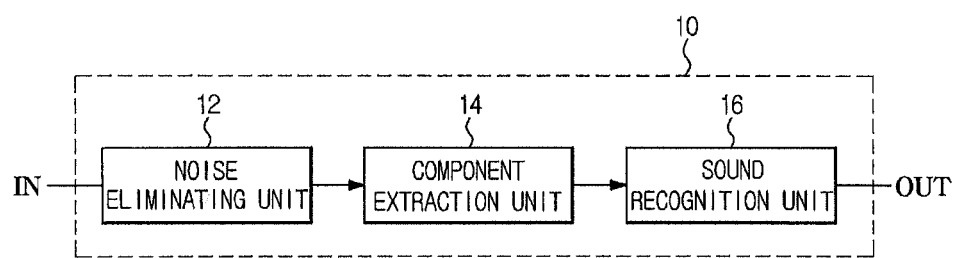
FIG. 3 is a block diagram of a sound detector according to example embodiments.

FIG. 3 is a block diagram of a sound detector according to example embodiments.

As shown in FIG. 3, the sound detector 10 may include a noise eliminating unit 12 to eliminate noise, a component extraction unit 14 to detect a signal component having a predetermined level from the signal from which noise is eliminated, and a sound recognition unit 16 to check whether the signal detected by the component extraction unit 14 is sound having a predetermined pattern.

The noise eliminating unit 12 may receive generated sound, eliminate noise from the received sound, and outputs the result of eliminating noise to the component extraction unit 14. The noise eliminating unit 12 may be implemented by a unit-channel (1-channel) speech enhancement device.

The component extraction unit 14 may extract a signal component having a predetermined level or more from the result of eliminating the noise, which is received from the noise eliminating unit 12, and output the extracted signal component to the sound recognition unit 16. The component extraction unit 14 may be implemented by a Voice Activity Detector (VAD).

The voice recognition unit 16 may check whether the signal component extracted by the component extraction unit 14 is predetermined sound, and output the checked result as a sound detection signal.

Figure 4:
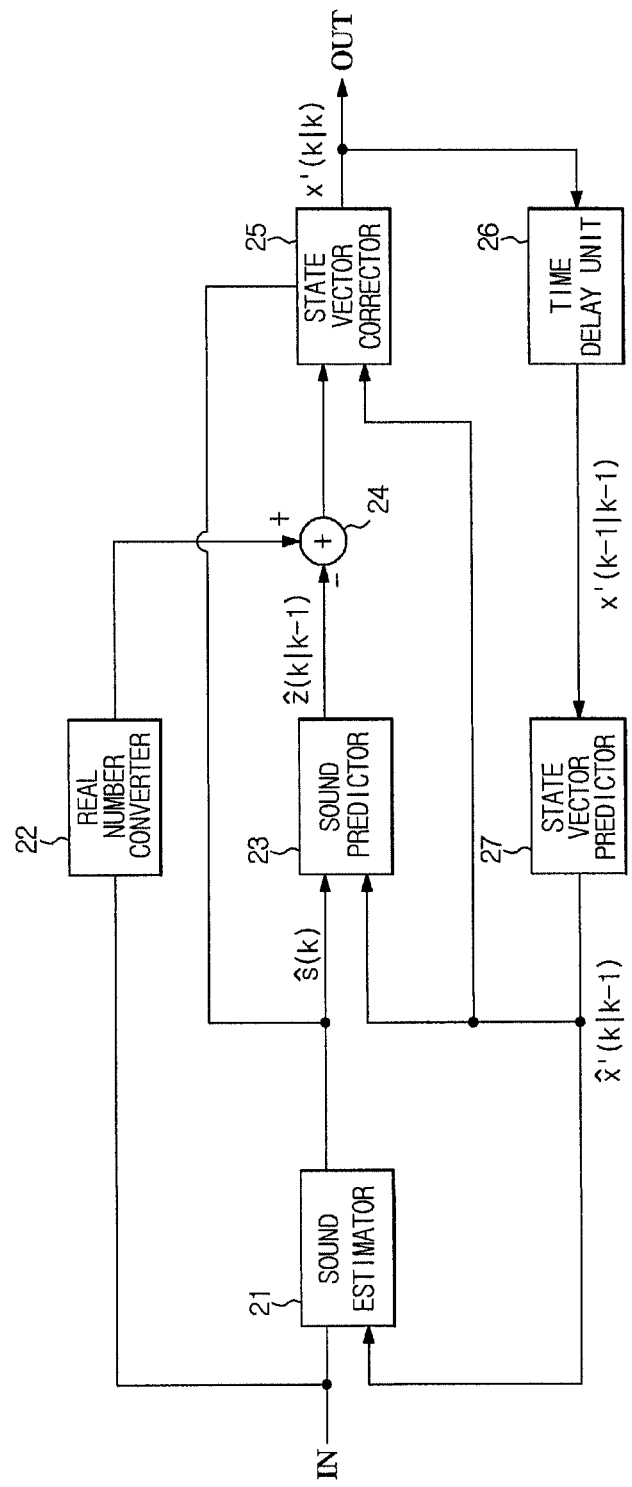
FIG. 4 is a block diagram of a direction estimator according to example embodiments.

FIG. 4 is a block diagram of a direction estimator 20 according to example embodiments.

As shown in FIG. 1, the direction estimator 20 may include a sound estimator 21, a real number converter 22, a sound predictor 23, a sound error generator 24, a state vector corrector 25, a time delay unit 26 and a state vector predictor 27.

The real number converter 22 may convert multi-channel sound in a complex number form, which is input through an input terminal, into a real number and output the converted real number to the sound error generator 24. The multi-channel sound may refer to sound input through the multiple microphones shown in FIG. 2.

The sound estimator 21 may estimate sound using the multi-channel sound in the complex number form, which is input through the input terminal, and the predicted state vector received from the state vector predictor 27, and output the estimated sound to the sound predictor 23. For example, the sound estimator 21 may estimate sound as expressed by Equation 2:

$$\hat{s}(k)=(A^H(\hat{\theta}(k|k-1))A(\hat{\theta}(k|k-1)))^{-1}A^H(\hat{\theta}(k|k-1))z_{array}(kT) \quad \text{Equation 2}$$

where $\hat{s}(k)$ denotes sound estimated by the sound estimator 21, $Z_{array}(kT)$ denotes multi-channel sound in a complex number form, which is input through the input terminal, and T denotes a sampling time. $A(\theta(t))$ is expressed by the following equation:

$$A((\theta(t))=[a(\theta(t))] \quad \text{Equation 3}$$

where a denotes a steering vector. With respect to the sound signal of the multi-microphone structure and a far-field narrowband of FIG. 2C, $a(\theta(t))$ is expressed by the following equation:

$$a(\theta(t)) = \begin{bmatrix} 1, \exp\left(-j2\pi\frac{d}{\lambda}\sin(\theta(t))\right), \ldots, \\ \exp\left(-j2(p-1)\pi\frac{d}{\lambda}\sin(\theta(t))\right) \end{bmatrix}^T \quad \text{Equation 4}$$

where d denotes a distance between adjacent microphones, $\lambda$ denotes the wavelength of the sound source 200, and p denotes the number of microphones. In FIG. 2C, p=8.

The sound predictor 23 may predict sound using the sound estimated by the sound estimator 21 and the state vector predicted by the state vector predictor 27, and output the predicted sound to the sound error generator 24. For example, the sound predictor 23 may predict sound as expressed by the following equation:

$$\hat{z}(k|k-1) = h(\hat{x}'(k|k-1), \hat{s}(k)) \quad \text{Equation 5}$$

$$= \begin{bmatrix} \text{Real}\{A(\hat{\theta}(k|k-1))\hat{s}(k)\} \\ \text{Image}\{A(\hat{\theta}(k|k-1))\hat{s}(k)\} \end{bmatrix}$$

where $\hat{z}(k|k-1)$ denotes the sound predicted by the sound predictor 23 and indicates a state of predicting z(k) at a time point (k−1). Z(k) may be expressed by the following equation.

$$z(k) = \begin{bmatrix} \text{Real}(z_{array}(t)) \\ \text{Image}(z_{array}(t)) \end{bmatrix}_{t=kT} \quad \text{Equation 6}$$

$$= A(\theta(k))s(k) + n(k)$$

where s(t) denotes the sound generated by the sound source, Real{i} denotes a real number of i, Image{I} denotes an imaginary number of i, and n(t) denotes measured noise and may be expressed by the following equation:

$$n(t)=[n_1(t),n_2(t),\ldots,n_p(t)]^T \quad \text{Equation 7}$$

In Equation 5, $\hat{x}'(k|k-1)$ denotes the state of x'(k) at a time point (k−1) as the state vector predicted by the state vector predictor 27, and x'(k) may be expressed by the following equation:

$$x'(k) = \left[\theta(k), \frac{d\theta(k)}{dk}\right] = F'x'(k-1) + G'w'(k) \quad \text{Equation 8}$$

where F' and G' are expressed by the following equations:

$$F' = \begin{bmatrix} 1 & T \\ 0 & 1 \end{bmatrix} \quad \text{Equation 9}$$

$$G' = \begin{bmatrix} \frac{1}{2}T^2 & 0 \\ 0 & T \end{bmatrix} \quad \text{Equation 10}$$

The sound error generator 24 may subtract the sound predicted by the sound predictor 23 from the converted result of the real number converter 22 and output the subtracted result to the state vector corrector 25 as a sound error signal.

The state vector corrector 25 may correct the predicted state vector of the mobile device received from the state vector predictor 27 using the sound error value received from the sound error generator 24 and the estimated sound $\hat{s}(k)$ received from the sound estimator 21, output the estimated direction of the corrected result through an output terminal, and output the corrected result to the time delay unit 26. For example, the state vector corrector 25 may correct the predicted state vector as expressed by the following equation:

$$x'(k|k)=\hat{x}'(k|k-1)+K'(k)[z(k)-\hat{z}(k|k-1)] \quad \text{Equation 11}$$

where x'(k|k) denotes the state vector corrected by the state vector corrector 25, $z(k)-\hat{z}(k|k-1)$ denotes the sound error value generated by the sound error generator 24, and K'(k) denotes Kalman gain and is expressed by the following equation:

$$K'(k)=\hat{P}'(k|k-1)H'^T(k,\hat{s}(k))R'^{-1}_e(k) \quad \text{Equation 12}$$

where $\hat{P}'(k|k-1)$ is expressed by the following equation:

$$\hat{P}'(k|k-1)=F'P'(k-1|k-1)F'^T+G'Q'G'^T \quad \text{Equation 13}$$

Where Q' is a process noise covariance matrix and may be expressed by Equation 14:

$$\hat{P}'(k|k-1)=F'P'(k-1|k-1)F'^T+G'Q'G'^T \quad \text{Equation 14}$$

P'(k|k) may be expressed by Equation 15:

$$P'(k|k)=\hat{P}'(k|k-1)-\hat{P}'(k|k-1)H'^T(k,\hat{s}(k))R'^{-1}_e(k)H'(k,\hat{s}(k))\hat{P}'(k|k-1) \quad \text{Equation 15}$$

In Equation 12, H'(k, $\hat{s}(k)$) is expressed by Equation 16:

$$H'(k,\hat{s}(k)) = \begin{bmatrix} \text{Real}\left(\frac{\partial}{\partial x'}(A(\theta(k))\hat{s}(k))\right) \\ \text{Image}\left(\frac{\partial}{\partial x'}(A(\theta(k))\hat{s}(k))\right) \end{bmatrix} \quad \text{Equation 16}$$

$$= \begin{bmatrix} 0 & 0 \\ s_{(1,1)} & 0 \\ \vdots & \vdots \\ s_{(1,p-1)} & 0 \\ 0 & 0 \\ c_{(1,1)} & 0 \\ \vdots & \vdots \\ c_{(1,p-1)} & 0 \end{bmatrix}$$

where p denotes the number of microphones when the multiple microphones are implemented in a line as shown in FIG. 2C. At this time, S(1,b)(1≤b≤p) is expressed by Equation 17 and C(1,b) is expressed by Equation 18:

$$s_{(1,b)} = -\sin(\pi b \sin(\theta(k)))\cos(\theta(k))\hat{s}(k) \qquad \text{Equation 17}$$

$$c_{(1,b)} = -\cos(\pi b \sin(\theta(k)))\cos(\theta(k))\hat{s}(k) \qquad \text{Equation 18}$$

In Equation 15, R'e(k) may be expressed by Equation 19:

$$R'_e(k) = R' + H'(k,\hat{s}(k))\hat{P}(k|k-1)H'^T(k,\hat{s}(k)) \qquad \text{Equation 19}$$

where R' is a measured noise covariance matrix and may be expressed by the following equation:

$$R' = E[n(k) \times n^T(k)] \qquad \text{Equation 20}$$

In Equation 11, $\hat{x}'(k|k-1)$ may be expressed by the following equation:

$$\hat{x}'(k|k-1) = F'\hat{x}'(k-1|k-1) \qquad \text{Equation 21}$$

The time delay unit 26 may delay the corrected result of the state vector corrector 25 and output the delayed result to the state vector predictor 27. The state vector predictor 27 may predict a state vector using the delayed result of the time delay unit 26 and output the predicted state vector to the sound estimator 21, the sound predictor 23 and the state vector corrector 25.

FIGS. 5A and 5B are diagrams of a relationship between a mobile device and a sound source according to example embodiments.

The direction estimator 20 may estimate the directional angle θ1 or −θ2 of the mobile device 100 relative to the sound source 200 at the first position P1, when the sound source 200 generates calling sound. The traveling direction determination unit 30 may determine the traveling direction such that the mobile device moves in the direction perpendicular to the direction of the sound source 200, when the direction estimator 20 estimates the directional angle of the mobile device 100 relative to the sound source 200. At this time, the traveling direction may be determined and the mobile device 100 may move in the direction 112a perpendicular to the sound source 200 on a right side thereof as shown in FIG. 5A or the mobile device 100 may move in the direction 112b perpendicular to the sound source 200 on a left side thereof as shown in FIG. 5B. The voice output unit 70 may output voice instructing the sound source 200 to generate the recall sound, when the mobile device 100 moves to the second position P2. The direction estimator 20 may re-estimate the position of the mobile device 100 relative to the sound source 200 when the recall sound of the sound source 200 is generated at the second position P2, and the sound source position calculator 40 may calculate the distance between the mobile device 100 and the sound source 200 by Equation 1.

$$R = L/\cos(180 - \theta 3) \qquad \text{Equation 1}$$

where L denotes the reference distance of the mobile device 100 which moves in the direction perpendicular to the direction of the sound source 200, which is stored in the mobile device 100 in advance, R denotes the distance between the mobile device 100 and the sound source 200, and θ3 denotes the directional angle of the mobile device 100 relative to the sound source 200 after the mobile device 100 moves by the reference distance L.

Meanwhile, the value of the directional angle θ3 of the mobile device 100 relative to the sound source 200 is about 120 degrees in FIG. 5A and the value of the directional angle θ3 of the mobile device 100 relative to the sound source 200 is about −120 degrees in FIG. 5B, signs of which are different from each other. However, since a cosine function is an even function and the same value as cos(180−120)=cos(180+120) =½ is output, the distance between the sound source 200 and the mobile device 100 may be obtained by Equation 1 when the mobile device 100 moves in the direction 112a perpendicular to the sound source 200 on the right side thereof and moves in the direction 112b perpendicular to the sound source 200 on the left side thereof. Meanwhile, the mobile device 100 moves by the reference distance L in the direction perpendicular to the direction of the sound source 200 when the sound having the predetermined pattern (e.g., clapping sound or calling sound) of the sound source 200 is detected. The reference distance L may be changed according to environments. That is, if an obstacle is present in the direction in which the mobile device 100 moves, the reference distance L may be decreased and the decreased reference distance L is included in the traveling information and is substituted for Equation 1 to be used to calculate the distance R.

Figure 6:
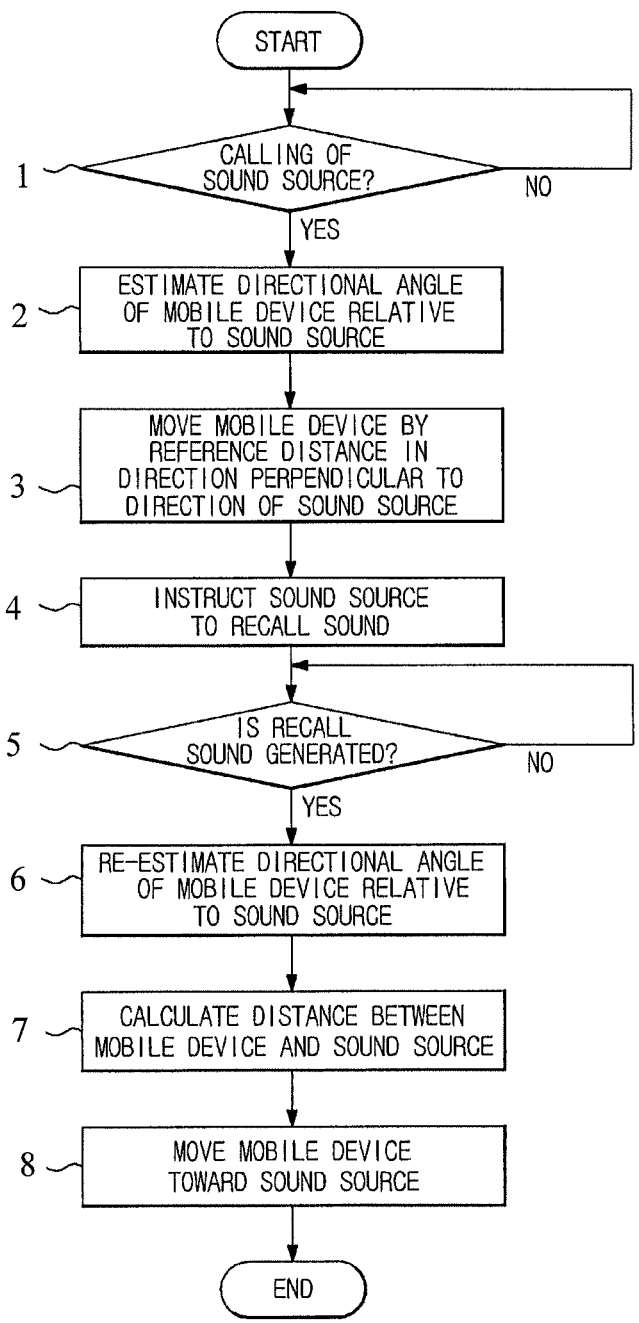
FIG. 6 is a flowchart illustrating a method of controlling a mobile device according to example embodiments.

FIG. 6 is a flowchart illustrating a method of controlling a mobile device according to example embodiments.

As shown in FIG. 6, the mobile device 100 may determine whether there is a calling of the sound source 200. The calling of the sound source 200 may be checked by determining whether sound having the predetermined pattern, which is stored in the mobile device 100 in advance, is output. Sound having various patterns such as "clapping sound" or "specific calling sound" may be stored in the mobile device 100 in advance (1).

Next, the direction estimator 20 may estimate the directional angle of the mobile device 100 if the calling of the sound source 200 is detected. The directional angle of the mobile device 100 may be the angle between the front direction of the mobile device 100 and the direction in which the mobile device 100 faces the sound source 200 (2).

Next, the traveling direction determination unit 30 may check the positional direction of the sound source 200 according to the directional angle of the mobile device 100 estimated by the direction estimator 20 and determine the direction perpendicular to the positional direction of the sound source 200 as the direction in which the mobile device 100 will move. The driving unit 60 may move the mobile device 100 by the reference distance in the direction perpendicular to the direction in which the mobile device 100 faces the sound source 200 (3).

Next, the voice output unit 70 may the output voice instructing the sound source 200 to generate the recall sound. For example, the voice may state "Clap your hands" or "Call me again" to instruct the sound source 200 to generate the recall sound (4).

Next, the direction estimator 20 may re-estimate the directional angle of the mobile device relative to the sound source 200, when the recall sound of the sound source 200 is generated (5 and 6).

Next, the sound position calculator 40 may calculate the distance between the sound source 200 and the mobile device 100 by a triangulation method using the re-estimated directional angle of the mobile device and the reference distance (7).

Next, the controller 50 may control the driving unit 60 according to the distance information between the sound source 200 and the mobile device 100 and the directional information of the sound source 200 to move the mobile device 100 to the sound source 200. The controller 50 may control the driving unit 60 such that the mobile device 100 moves by the distance less than the distance R between the mobile device 100 and the sound source 200 (8).

The above-described embodiments may be recorded in computer-readable media including program instructions to implement various operations embodied by a computer. The media may also include, alone or in combination with the program instructions, data files, data structures, and the like. Examples of computer-readable media (computer-readable storage devices) include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may be a plurality of computer-readable storage devices in a distributed network, so that the program instructions are stored in the plurality of computer-readable storage devices and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although embodiments have been shown and described, it should be appreciated by those skilled in the art that changes may be made in these embodiments without departing from the principles and spirit of the disclosure, the scope of which is defined in the claims and their equivalents.

What is claimed is:

1. A method of controlling a mobile device, the method comprising:
   in response to a sound source generating a call sound, moving, by a computer, the mobile device by a reference distance in a direction perpendicular to a direction in which the mobile device faces the sound source;
   outputting, by the computer, a voice to instruct the sound source to generate a recall sound when the mobile device has moved the reference distance;
   checking, by the computer, a directional angle of the mobile device;
   calculating a distance between the mobile device and the sound source according to the reference distance and the directional angle of the mobile device; and
   moving the mobile device toward the sound source.

2. The method according to claim 1, wherein the moving of the mobile device by the reference distance in the direction perpendicular to the direction in which the mobile device faces the sound source, when the sound source generates the call sound includes:
   checking an angle between a front direction of the mobile device and the direction in which the mobile device faces the sound source according to the calling sound; and
   rotating the mobile device according to an angle between the direction perpendicular to the direction in which the mobile device faces the sound source and the direction in which the mobile device faces the sound source and moving the mobile device by the reference distance.

3. The method according to claim 1, wherein the moving of the mobile device by the reference distance in the direction perpendicular to the direction in which the mobile device faces the sound source includes moving the mobile device by the reference distance in the direction perpendicular to the direction in which the mobile device faces the sound source on a right side thereof.

4. The method according to claim 1, wherein the moving of the mobile device by the reference distance in the direction perpendicular to the direction in which the mobile device faces the sound source includes moving the mobile device by the reference distance in the direction perpendicular to the direction in which the mobile device faces the sound source on a left side thereof.

5. The method according to claim 1, wherein the distance between the mobile device and the sound source is calculated by the following equation according to the reference distance and the directional angle of the mobile device:

$$R = L / \cos(180 - \theta)$$

where, R denotes the distance between the mobile device and the sound source, L denotes the reference distance, and θ denotes the directional angle of the mobile device relative to the sound source.

6. The method according to claim 1, wherein, when the distance between the mobile device and the sound source is calculated according to the reference distance and the directional angle of the mobile device, the mobile device moves toward the sound source using information about the direction of the sound source and the distance as traveling information.

7. The method according to claim 1, wherein the call sound of the sound source is sound having a predetermined pattern stored in the mobile device in advance.

8. The method according to claim 1, wherein:
   the reference distance changes according to an environment of the mobile device, and
   when the reference distance changes, the distance between the mobile device and the sound source is calculated according to the changed reference distance and the directional angle of the mobile device.

9. The method of claim 1, wherein the mobile device eliminates noise when receiving the call sound and the recall sound from the sound source to provide the call sound without noise and the recall sound without noise.

10. The method of claim 9, wherein the mobile device extracts a signal component having a level above a predetermined level from the call sound without noise and the recall sound without noise uses the signal component to determine whether the call sound and the recall sound are a predetermined sound.

11. A mobile device, comprising:
   a direction estimator to estimate a directional angle of the mobile device relative to a sound source making a call sound;
   a traveling direction determination unit to determine a traveling direction using the estimated directional angle;
   a driving unit to move the mobile device by a reference distance in the traveling direction;
   a voice output unit to output a voice to instruct the sound source to generate a recall sound when the mobile device has moved the reference distance; and
   a sound source position calculator to calculate a distance between the sound source and the mobile device according to the reference distance and the directional angle of the mobile device when the directional angle of the mobile device relative to the sound source is estimated according to the recall sound,
   wherein the traveling direction determination unit determines the traveling direction as a direction perpendicular to the direction in which the mobile device faces the sound source when the call sound is made.

12. The mobile device according to claim 11, wherein the direction estimator estimates the directional angle of the mobile device relative to the sound source based on one of the call sound and the recall sound by the sound source.

13. The mobile device according to claim 11, wherein the directional angle of the mobile device relative to the sound source is an angle between a front direction of the mobile device and a direction in which the mobile device faces the sound source.

14. The mobile device according to claim 11, wherein the traveling direction determination unit determines the direction in which the mobile device faces the sound source as the traveling direction when the recall sound is generated.

15. The mobile device according to claim 11, wherein the driving unit drives the mobile device toward the sound source when the distance between the sound source and the mobile device is calculated.

16. The mobile device according to claim 11, wherein the voice output unit outputs voice to instruct the sound source to generate the recall sound when the mobile device moves by the reference distance.

17. The mobile device according to claim 11, wherein the sound source position calculator calculates the distance between the sound source and the mobile device by the following equation according to the reference distance and the directional angle of the mobile device estimated by the recall sound:

$$R = L/\cos(180-\theta)$$

where R denotes the distance between the mobile device and the sound source, L denotes the reference distance, and θ denotes the directional angle of the mobile device relative to the sound source.

18. At least one non-transitory computer readable medium comprising computer readable instructions that control at least one processor to implement a method of controlling a mobile device, comprising:

in response to a sound source generating a call sound, moving the mobile device by a reference distance in a direction perpendicular to a direction in which the mobile device faces the sound source;

outputting a voice to instruct the sound source to generate the recall sound when the mobile device has moved the reference distance;

checking a directional angle of the mobile device;

calculating a distance between the mobile device and the sound source according to the reference distance and the directional angle of the mobile device; and moving the mobile device toward the sound source.

* * * * *

UNITED STATES PATENT AND TRADEMARK OFFICE
CERTIFICATE OF CORRECTION

PATENT NO. : 8,731,715 B2  
APPLICATION NO. : 12/954236  
DATED : May 20, 2014  
INVENTOR(S) : Won Jun Ko et al.

Page 1 of 1

It is certified that error appears in the above-identified patent and that said Letters Patent is hereby corrected as shown below:

In the Claims,

Column 12, Line 16, In Claim 5, delete "and 0" and insert -- and $\theta$ --, therefor.

Column 14, Line 5, In Claim 17, delete "and 0" and insert -- and $\theta$ --, therefor.

Signed and Sealed this
Fourth Day of November, 2014

Michelle K. Lee
*Deputy Director of the United States Patent and Trademark Office*